United States Patent [19]
Feth et al.

[11] Patent Number: 5,881,185
[45] Date of Patent: Mar. 9, 1999

[54] METHOD AND APPARATUS FOR ACCURATELY FABRICATING A DEPOLARIZER

[75] Inventors: John R. Feth; Joseph F. Straceski, both of Phoenix, Ariz.; Isaac R. Jessop, Monmouth, Oreg.

[73] Assignee: Honeywell Inc., Minneapolis, Minn.

[21] Appl. No.: 697,050

[22] Filed: Aug. 19, 1996

[51] Int. Cl.$^6$ .................................................. G02B 6/00
[52] U.S. Cl. .............................. 385/11; 385/97; 356/73.1
[58] Field of Search ................................. 385/11, 95–99; 356/73.1; 250/227.11, 227.17

[56] References Cited

U.S. PATENT DOCUMENTS

| | | | |
|---|---|---|---|
| 4,603,941 | 8/1986 | Fujii et al. | 385/11 |
| 4,784,458 | 11/1988 | Horowitz et al. | 385/97 |
| 4,801,189 | 1/1989 | Shaw et al. | 385/28 |
| 4,923,268 | 5/1990 | Xu | 385/50 |
| 5,156,663 | 10/1992 | Itoh et al. | 65/501 |
| 5,167,685 | 12/1992 | Fukuma et al. | 385/96 |
| 5,218,652 | 6/1993 | Lutz | 385/11 |
| 5,245,400 | 9/1993 | Anjan et al. | 356/73.1 |
| 5,257,329 | 10/1993 | Blyler, Jr. et al. | 385/11 |
| 5,295,219 | 3/1994 | Koya et al. | 385/134 |
| 5,351,124 | 9/1994 | Laskoskie et al. | 385/11 |
| 5,408,545 | 4/1995 | Lee et al. | 385/11 |
| 5,417,733 | 5/1995 | Wesson | 65/378 |
| 5,457,756 | 10/1995 | Hartl et al. | 385/11 |
| 5,486,916 | 1/1996 | Michal et al. | 385/12 |
| 5,488,683 | 1/1996 | Michal et al. | 385/98 |

FOREIGN PATENT DOCUMENTS

| | | |
|---|---|---|
| 0414369 | 2/1991 | European Pat. Off. . |
| 06-180410 | 6/1994 | Japan . |

OTHER PUBLICATIONS

Ferro, P., etal. "All–Optical Polarisation Differential Amplification with Birefringent Fibre,", *Electronics Letters,* vol. 30, No. 19, Sep. 15, 1994, pp. 1616–1617.

Patent Abstracts of Japan, vol. 011, No. 329 (P–629), Oct. 27, 1987 (abstract of Japanese patent 62 111211A).

Patent Abstracts of Japan, vol. 018, No. 519 (P–1807), Sep. 29, 1994 (abstract of Japanese patent 06 180410A).

"Polarization optics of twisted single–mode fibers", Ulrich, R. and Simon, A., *Applied Optics,* vol. 18, No. 13, pp. 2241–2251, Jul. 1, 1979.

"Scattering and depolarization by large conducting spheres with rough surfaces", Bahar, E., and Chakrabarti, S., *Applied Optics,* vol. 24, No. 12, pp. 1820–1825, Jun. 15, 1985.

"Depolarization and cross polarization in ellipsometry of rough surfaces", Williams, M.W., *Applied Optics,* vol. 25, No. 20, pp. 3616–3622, Oct. 15, 1986.

"Depolarization of polarized light caused by high altitude clouds. 1: Depolarization of lidar induced by cirrus", Sun, Y.Y. et al., *Applied Optics,* vol. 28, No. 17, pp. 3625–3631, Sep. 1, 1989.

"Depolarization of polarized light caused by high altitude clouds. 2: Depolarization of lidar induced by water clouds", Sun, Y.Y. et al., *Applied Optics,* vol. 28, No. 17, pp. 3633–3638, Sep. 1, 1989.

"Polarization Dispersion Measurement on Twisted Single–Mode Optical Fibers", Sakai, J. et al., *Journal of Lightwave Technology,* vol. Lt–1, No. 4, pp. 567–571, Dec. 1983.

*Primary Examiner*—Hemang Sanghavi
*Attorney, Agent, or Firm*—John G. Shudy, Jr.

[57] ABSTRACT

Aligned birefringent fiber segments are reliably and efficiently rotated approximately 45° relative to each other until the extinction ratio measurement at the output is approximately 0 dB, then birefringent fibers are fused. To determine the extinction ratio, a Wollaston analyzer is placed at the output of the birefringent fiber. Photodetectors placed on each output of the Wollaston analyzer, substantially simultaneously measure the output intensity of each propagation axis.

20 Claims, 2 Drawing Sheets

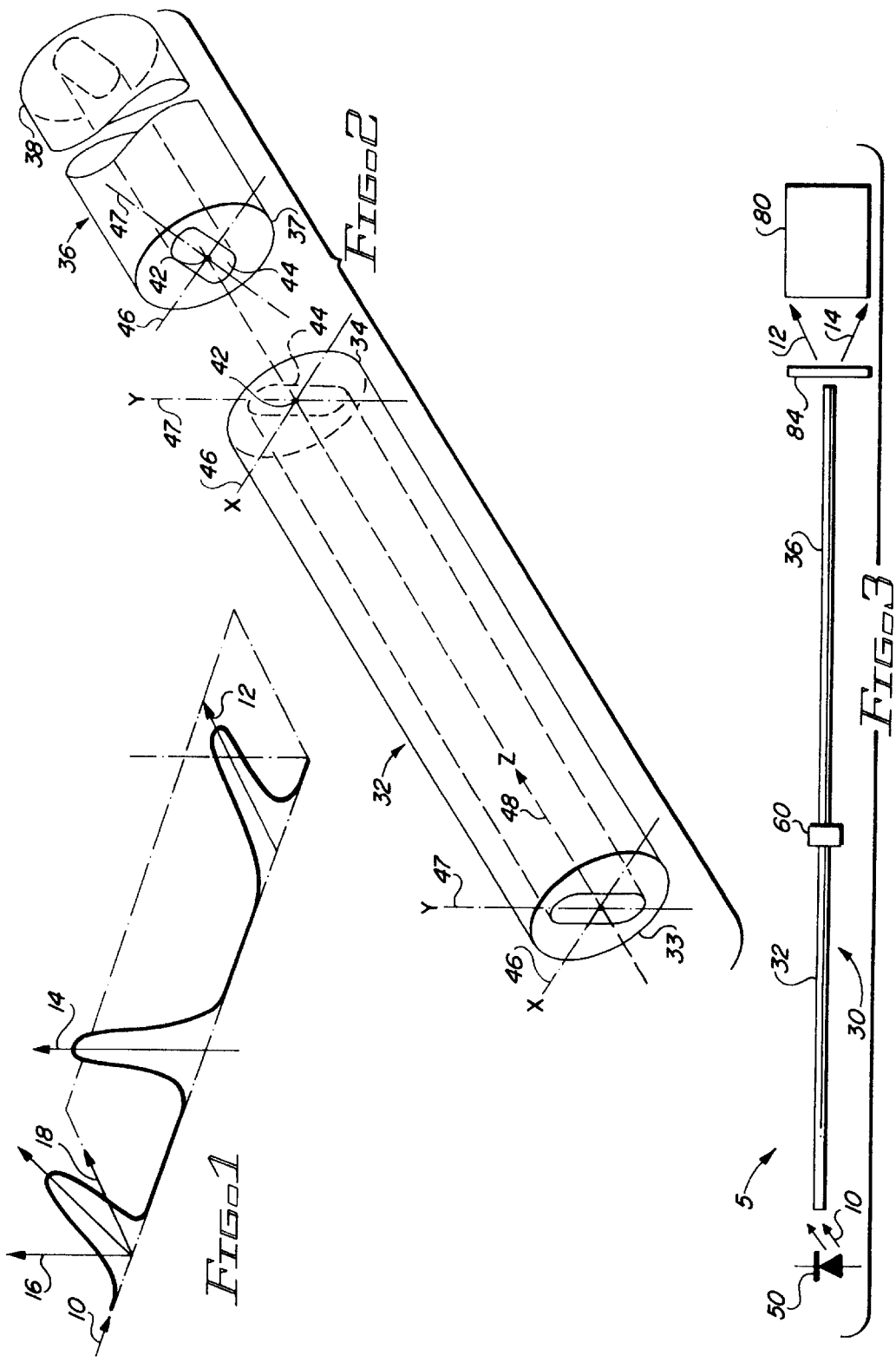

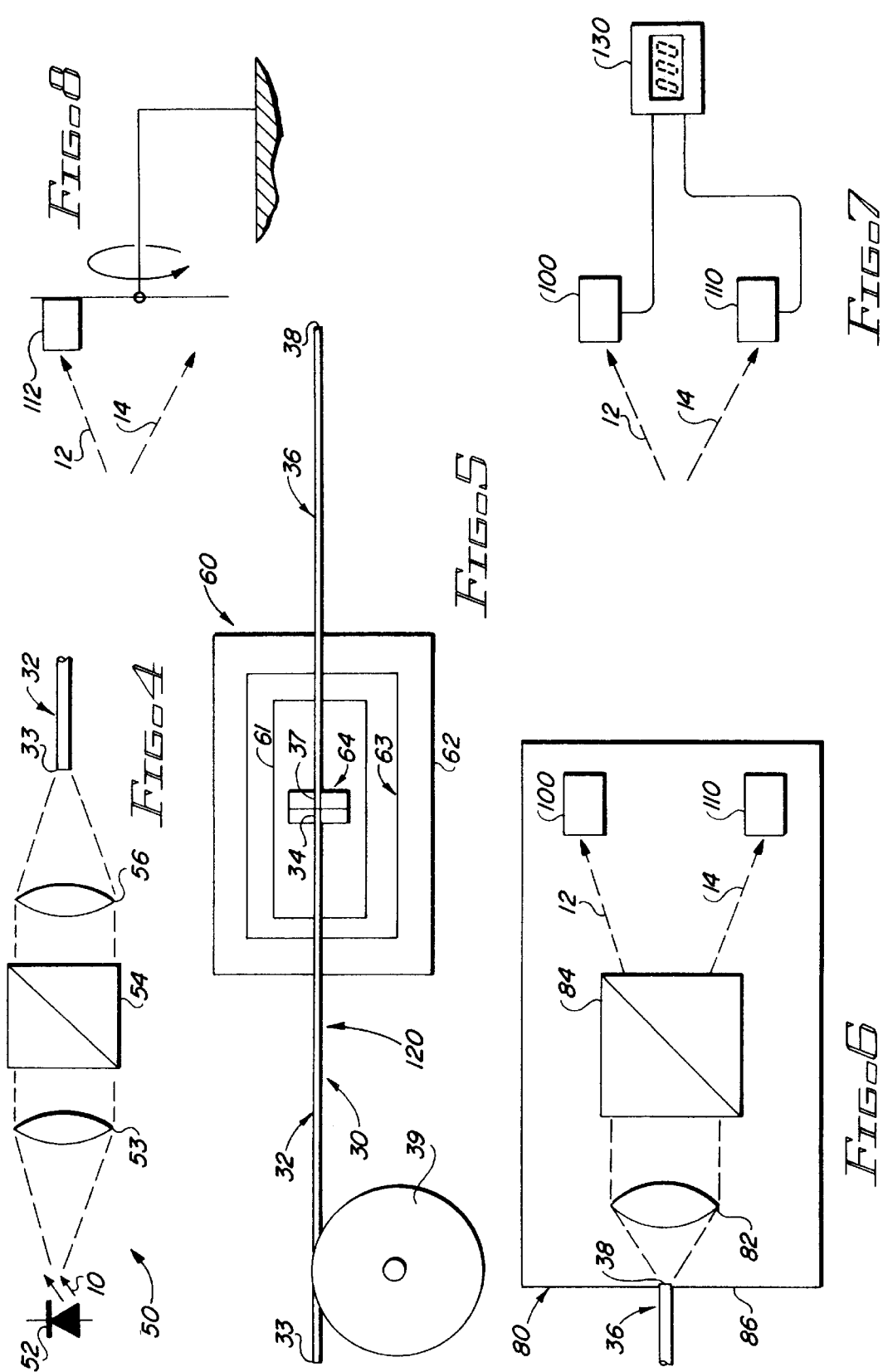

METHOD AND APPARATUS FOR ACCURATELY FABRICATING A DEPOLARIZER

TECHNICAL FIELD OF THE INVENTION

This invention generally relates to a depolarizer, and more particularly, to an apparatus and method for reliably, efficiently and accurately fabricating a depolarizer through the use of substantially simultaneous measurements of the output intensities of the electromagnetic components emanating from the birefringent fiber.

BACKGROUND OF THE INVENTION

Depolarizers are widely used in products that incorporate optical fiber, i.e. fiber optic gyroscopes, and play a major role in sensor technology. Because depolarizers can increase the performance and quality of a product containing optical fiber, depolarizers are important to fiber optic gyro systems. Specifically, because gyro error signals arise as a result of different polarization conditions of the individual light wave trains within the optical fiber, depolarizers can is be used to suppress gyro error.

A common technique for fabricating a depolarizer involves aligning the optical axes of two birefringent fibers at 45°. To determine a successful 45° alignment, an analyzer measures the polarization extinction ratio at the output of the fiber. When the measured intensity is independent of the analyzer's angular position with respect to the second fiber, a 45° alignment is achieved. The extinction ratio designates the ratio of the intensities contained in any two orthogonal axes of the birefringent fiber (dB=10 log[$I_{min}/I_{max}$]). The decibel (dB) is a customary unit for designating the ratio. An optimum polarizer requires a 90 dB extinction ratio, while an optimum depolarizer requires a 0 dB extinction ratio.

After aligning a broad band polarized input source, the optimum depolarizer would have an output with an equal amount of uncorrelated light in each of the two orthogonal axes, and thus, the extinction ratio equal to 0 dB because $I_{min}=I_{max}$ and log[1]=0. To achieve an equal amount of light in each axis, the axes of two fiber segments must be aligned at 45° relative to each other. An azimuthal splice orientation alignment of 45° would transfer incoming polarized light into equal orthogonal electric fields ($E_{max}$ and $E_{min}$ are equal electric field components in each axis). An alignment not equaling 45° would result an increased intensity along one axis and a decreased intensity along the other axis.

In current methods, when fabricating a depolarizer, the output photodetector is configured with an analyzer to measure the maximum and minimum output intensities (e.g. $I_{min}$ and $I_{max}$ are the intensities along the fast and slow axis) of the coupled fiber. That is, a PM fiber is cleaved so that the resulting fiber segments are long enough for source depolarization. Arbitrarily polarized light is coupled into the first fiber. The second fiber is aligned with the first fiber. $I_{min}$ and $I_{max}$ are determined by locating the maximum and minimum intensity axes at the end of the second fiber. The first fiber is rotated with respect to the second fiber, then the analyzer is rotated to determine the extinction ratio from $I_{max}$ and $I_{min}$. If the extinction ratio is 0 dB, the fiber segments are fused to form a depolarizer. If the extinction ratio is not 0 dB, the first fiber must again be rotated until the intensities are equal in each axes, then the analyzer is again rotated to determine if a 0 dB extinction ratio has been achieved. Iteratively rotating the first fiber segment and analyzer requires extra skill and time and is susceptible to measurement errors.

If, when the light enters the first fiber, the light is not entirely on one birefringent axes, the light will be at least partially decorrelated prior to the splice alignment. Therefore, because of preexisting decorrelation, determining the quality of the splice angle alignment is difficult. More particularly, if the light enters the first fiber at 45° from the fast and slow axes, the light will decorrelate even if no splice misalignment existed. Optimally, instead of coupling the light into the first fiber at any random angle, the light enters the fiber on one birefringent axis. Light entering the fiber on one axis will remain correlated with respect to itself throughout the entire fiber. Thus, light entering on one axis places the burden of distribution between axes solely on the 45° splice. Complete decorrelation (or depolarization) requires an exact 45° splice.

Many methods for depolarizing light exist, but each of the currently known methods suffer from important disadvantages making them difficult to use, unreliable and/or expensive. The Laskoskie, et al. patent, U.S. Pat. No. 5,351,124, discloses an appropriate system for aligning the birefringent axes through the use of a temporary third fiber and an interferometer. The '124 patent recognizes the problems with the prior art systems; however, the solution proposed in the '124 patent requires the use of expensive, complicated components, such as an interferometer, which require special skills for its operation.

To overcome the iterative rotation problems of the prior art, the Michal patent (U.S. Pat. No. 5,486,916) discloses an apparatus for aligning the birefringent axes through the use of a heated fiber coil. A low birefringent fiber sensing coil is connected to one of the output circuits and a reciprocal interferometer is also used to measure the alignment of the two fibers. By incorporating a heating coil and reciprocal interferometer, the '916 patent requires the use of expensive, complicated devices for the fabrication of a depolarizer.

Other systems that exist include a method that has been used to produce effectively unpolarized light is to split a polarized beam into a plurality of subbeams and then recombine them. The recombination produces a varying pattern of polarization states across the face of a detector to form a spatial average. This method is not useful with single mode fibers because it involves a spatial average across a comparatively large area.

Yet another way of making a depolarizer is through the use of AC detection. The AC signal is generated by birefringence modulation. The modulation disappears when the axes of both fibers are rotated to 45° with respect to each other. However, the AC detection method requires high voltages to operate a Pockels cell which is not only dangerous and costly, but also a complex optical circuit arrangement.

The prior art indicates that while conventional depolarizer fabrication methods exist, they each suffer from the principal disadvantage of requiring complicated devices and iterative measurements. Thus, a system and method is needed for providing a depolarizer which overcomes the shortcomings of the prior art. Therefore, a long-felt need exists to ameliorate the disadvantages occasioned by the known fabrication techniques of depolarizers in a more efficient, accurate and cost-effective manner to overcome the prior art.

SUMMARY OF THE INVENTION

The present invention discloses an innovative method and apparatus for efficiently fabricating a depolarizer. While the manner in which the present invention fabricates a depolarizer is described in greater detail hereinafter below, in general, the method and apparatus reliably fabricates a depolarizer through the use of a substantially simultaneous measurement of the orthogonal output intensities of the electromagnetic components emanating from the optical fiber.

The present method and apparatus for fabricating a depolarizer includes a polarized source, first and second birefringent fibers, a means for orienting fibers and a detection system. The alignment device includes a means for splicing and orienting the fibers relative to one another. The detection system includes an analyzer configured for separating the electromagnetic components and substantially simultaneously measuring the intensity of each component. The detectors can communicate with a device which will automatically calculate the extinction ratio of the fiber.

BRIEF DESCRIPTION OF THE DRAWING FIGURES

Preferred exemplary embodiments of the present invention will hereinafter be described in conjunction with the appended drawing figures, wherein like numerals denote like elements and:

FIG. 1 shows the separation in time and distance of a wave packet having a polarized input at 45° to the birefringent axes, after passing through a birefringent element;

FIG. 2 shows a schematic diagram of two birefringent PM fibers, with axes misaligned by 45°, containing exemplary elliptical stress members as used in the present invention;

FIG. 3 shows the arrangement of the fibers and equipment for alignment determination;

FIG. 4 shows a schematic diagram of an exemplary broad band source for the present invention;

FIG. 5 shows a schematic diagram of an exemplary alignment device for the present invention;

FIG. 6 shows a schematic diagram of an exemplary detecting device for the present invention;

FIG. 7 shows coupled detectors as an alternative embodiment of the detectors from the detecting device of FIG. 6; and, FIG. 8 shows one rotating detector which still conducts substantially simultaneous detection of the electromagnetic components as an alternative embodiment of the detectors from the detecting device of FIG. 6.

DETAILED DESCRIPTION OF A PREFERRED EXEMPLARY EMBODIMENT

An apparatus and method according to various aspects of the present invention reliably fabricates a depolarizer through the use of substantially simultaneous measurements of the output intensities of electromagnetic x 12 and y 14 components emanating from a birefringent fiber. While the manner in which a splice misalignment is determined is described in greater detail hereinbelow, in general, the intensity ratio of $I_y$ 14 and $I_x$ 12 exiting an optical fiber 50 is simultaneously detected upon manipulation of fiber segments 32,36. Referring momentarily to FIG. 3, an exemplary apparatus 5 for fabricating a depolarizer according to various aspects of the present invention comprises a polarized source 50, an alignment device 60, a birefringent fiber 30 having fiber segments 32,36, an analyzer 84 and a detecting device 80. As described in greater detail below, upon orientation of birefringent fiber segments 32,36 by alignment device 60, detecting device 80 detects $I_y$ 14 and $I_x$ 12 exiting birefringent fiber segment 36 to determine the optimum intensity ratio, thus indicating proper alignment.

Referring to FIG. 1, showing the separation in time and distance of a wave packet having a polarized input at 45° to the birefringent axes, after passing through a birefringent element. The figure shows an exemplary schematic diagram of the decorrelation of light 10 in fiber 36. When a pulse of light 10 passes the spliced 45° alignment between fiber segments 32,36 (as seen in FIG. 3), pulse of light 10 is decomposed into pulses along x and y axes, $I_x$ 12 and $I_y$ 14.

Referring to FIG. 2, the figure shows a schematic diagram of birefringent fiber segments 32,36 with respective birefringent x 46 and y 47 axes aligned at 45°, as measured by the arc value between the respective axes 46,47 of fiber segments 32,36. Stress member 44 applies stress to inner core 42 of fibers 32,36. The stress produces a refractive index that is different in x-axis 46 and y-axis 47, thus fibers 32,36 affect light 10 differently along x-axis 46 and along y-axis 47. Therefore, the index of refraction along x-axis 46 is different than index of refraction along y-axis 47. Z-axis 48 in the exemplary schematic diagram of the fiber represents the propagation axis along the fiber core.

With reference to FIG. 3, in a preferred embodiment, after cleaving fiber 30, fiber segments 32,36 are suitably of different lengths. Fiber 36 preferably is as long as needed, as long as fiber 36 is at least the smallest length needed for decorrelation. Fiber 32 is preferably at least twice as long as fiber 36, but fiber 32 suitably has no upper limit in length. Therefore, with momentary reference to FIG. 5, fiber 32 preferably includes fiber storage 39 preferably in the form of a spool of fiber. As described above, the 45° alignment is suitably fabricated between fibers 32,36 at a location so that the final ratio between fiber 32 and fiber 36 is preferably approximately 2:1. This preferred ratio allows continuous fabrication of depolarizers from a single fiber storage spool 39 of fiber with only one input coupling set-up.

Referring again to FIG. 3, source 50 suitably comprises any broad band source capable of producing polarized light and being coupled to a birefringent fiber, such as a laser diode and/or the like. Referring now to FIG. 4, the exemplary source in accordance with a preferred embodiment preferably includes a broad band source 52, a collimating lens 53, an input polarizer 54 and an input coupling lens 56. Broad band source 52 suitably comprises any broad band source capable of producing a light beam comprised of a broad band of frequencies of light. In accordance with a preferred embodiment of this invention, broad band source 52 comprises a short coherence length infrared laser diode. Collimating lens 53 suitably comprises any lens capable of collimating a light beam. In accordance with a preferred embodiment of this invention, collimating lens 53 comprises a stress-free 0.11 NA microscope objective model no. Rolyn Optics 5:1 NA 0.11. Input polarizer 54 suitably comprises any device capable of polarizing a light beam. In accordance with a preferred embodiment of this invention, input polarizer 54 comprises Glan-Thomson polarizer model no. MGT E14. Input coupling lens 56 suitably comprises any device capable of coupling a light beam into a fiber. In accordance with a preferred embodiment of this invention, input coupling lens 56 comprises a stress-free 0.1 NA microscope objective model no. Rolyn Optics 5:1 NA 0.11.

With continued reference to FIG. 3, fiber 30 suitably comprises any single mode polarization maintaining (PM) optical waveguide capable of transmitting a light beam, such as an optical fiber and/or the like. Referring now to FIG. 5, exemplary fiber 30 in accordance with a preferred embodiment preferably includes a continuous birefringent fiber 30 that is cut to comprise first fiber segment 32, having a first end 33, fiber storage 39 and a second end 34, and second fiber segment 36, having a first end 37 and a second end 38. In accordance with a preferred embodiment of this invention, fiber 30 comprises a single mode, PM fiber. As an alternative embodiment, fiber 30 comprises two separate fibers that are fused together during the depolarizer fabrication process.

Referring again to FIG. 5, exemplary alignment device 60 suitably comprises any device capable of aligning and splicing two fibers 32,36, such as an x-y-z adjuster 62, an azimuthal adjuster 61, a splicer 63, a combination thereof and/or the like. X-y-z adjuster 62 suitably comprises any device capable of translating optical fibers. Azimuthal adjuster 61 suitably comprises any device capable of rotating optical fibers. Fusion splicer 63 suitably comprises any device capable of splicing together two optical fibers. In a preferred embodiment, x-y-z adjuster 62, azimuthal adjuster 61 and fusion splicer 63 is integrated into one device comprising Ericsson model no. FSU 905. Alignment device 60 is located between first fiber segment 32 and second fiber segment 36.

Referring now to FIG. 6, detecting device 80 suitably comprises any device capable of detecting a light beam, such as a photodetector and/or the like. The exemplary detecting device in accordance with a preferred embodiment preferably includes an output collimator 82, a polarizing beam splitter 84 and two output photodetectors 100, 110. An opaque structure 86 encloses output collimator 82, beam splitter 84 and two output photodetectors 100, 110. Opaque structure 86 suitably comprises any device capable of shielding substantially all ambient light. In accordance with a preferred embodiment of this invention, opaque structure 86 comprises an aluminum sheet. Output collimator 82 suitably comprises any device capable of substantially collimating a light beam. In accordance with a preferred embodiment of this invention, output collimator 82 comprises a stress-free 0.1 NA microscope objective model no. Rolyn Optics 5:1 NA 0.11. Beam splitter 84 suitably comprises any device capable of splitting a light beam into its X and Y polarization components. In accordance with a preferred embodiment of this invention, beam splitter 84 comprises a Wollaston Analyzer manufactured by Karl Lambrecht, Inc. model no. MW2A10-20.

With continued reference to FIG. 6, output photodetectors 100, 110 suitably comprise any device capable of substantially simultaneously measuring the output intensities of electromagnetic components 12,14 emanating from the optical fiber. In accordance with a preferred embodiment of this invention, output photodetectors 100, 110 comprise Photodyne model no. 550. With reference to FIG. 7, photodetectors 100,110 are suitably connected to a device such as Photodyne model no. 22 XLC, 130 which will automatically calculate the extinction ratio of exiting light 10. With reference to FIG. 8, as an alternative embodiment, photodetectors 100,110 are one photodetector 112. Photodetector 112 is rotated in front of each electromagnetic component 12,14 at a speed to allow for substantially simultaneous measurement of electromagnetic components 12,14.

With reference to FIG. 5, substantially polarized light is preferably input along an axis, i.e. the y-axis, of fiber segment 32 by any suitable means. Fiber 30 is preferably aligned so that all polarized light impinges on detector 100. Preferably without disturbing the input or output alignments between source 52 (as seen in FIG. 4), photodetectors 100,110 and fiber ends 33,38, fiber 30 is suitably cleaved into two pieces, first fiber segment 32 and second fiber segment 36. Second end 34 of first fiber segment 32 and first end 37 of second fiber segment 36 are suitably inserted into fiber chucks 64 of fusion splicer 63. Fiber ends 34, 37 are suitably aligned, using x-y-z adjuster 62, with respect to each other in x-y-z planes. Fibers 32,36 are then suitably rotated using azimuthal adjuster 61 until device 130 calculates the extinction ratio measurement at photodetectors 100, 110 to be approximately 0 dB, thus creating a splice alignment of approximately 45°. A preferred use of dual photodetectors 100, 110 allows a more accurate 45° alignment by about an order of magnitude. Using a preferred embodiment, a splice alignment with an error of only +/−0.1° has been achieved.

With reference to FIG. 6, the extinction ratio can be suitably measured by reading the intensities from each photodetector 100, 110 and suitably calculating the extinction ratio. In a preferred embodiment, as in FIG. 7, two photodetectors 100, 110 are suitably connected to device 130 that will automatically calculate the extinction ratio. Thus, first fiber segment 32 is preferably rotated until device 130 reads 0 dB.

With momentary reference to FIG. 5, upon reaching an extinction ratio of 0 dB, fiber segments 32, 36 are then suitably fused in fusion splicer 63. Fusion of fiber segments 32,36 is preferably accomplished by passing an electrical arc around ends 34,37 to melt fiber segments 32,36 together. Before new Lyot depolarizer 120 is removed from the apparatus, Lyot depolarizer 120 is suitably trimmed to its final configuration. Due to the availability of extra optical fiber wound around fiber storage 39, after removing new Lyot depolarizer 120. the extra optical fiber can be unwound and used as a new optical fiber 30 without disturbing the input alignment from source 50.

With reference to FIG. 6, the splice misalignment from 45° and the degree of polarization of the depolarized output are suitably characterized with a final extinction ratio measurement. Most photodetectors for intensity measurement are slightly polarization sensitive. The detector response typically differs up to 0.04 to 0.08 dB associated with a change in the state of polarization and/or the intrinsic differences in photodetectors 100, 110. To neglect the possibility of error due to the different responsivities of photodetectors 100, 110, photodetectors 100, 110 are suitably configured and mounted such that they may be switched between each output 12,14 of beam splitter 84. Thus, two different extinction ratios are preferably measured for the same light 10 emanating from Lyot depolarizer 120 by suitably placing each photodetector 100, 110 in front of each component 12,14 emanating from beam splitter 84. For example, photodetector 100 suitably measures $I_x$ 12 and photodetector 110 suitably measures $I_y$ 14, then photodetector 100 suitably measures $I_y$ 14 and photodetector 110 suitably measures $I_x$ 12. Any intensity differences between photodetectors 100, 110 for same output 12,14 from beam splitter 84 is preferably noted and the final intensity result is suitably calculated. The true extinction ratio of Lyot depolarizer 120 output 12,14 is half of the difference of each of the extinction ratio measurements.

More particularly, $\theta_1 = \pi/4 + \epsilon$, when $\epsilon$ is the splice misalignment; $\theta_2 = \delta$, or the misalignment of polarizer 84 (as seen in FIG. 6) from the fiber axes; $E_x$ and $E_y$ are the orthogonal electric fields of the output passed by polarizing beamsplitter 84 (as seen in FIG. 6); and $E_t$ input at fiber end 23 (see FIG. 4) is polarized input substantially along a fiber axis. If $I_x = E_x \cdot E_x^*$ (where $E_x^*$ is the complex conjugate) and fiber segments 32, 36 are a suitable length for source depolarization (viz, longer than the coherence length of the broad band source or approximately equal to the length of fiber segment 36), all contributions of the actual lengths of segments 32, 36 can be neglected. Because of the use of a broadband source, the fields $E_x$ and $E_y$ are uncorrelated after passing through fiber segment 36 so that the time averages of the cross products ($E_x \cdot E_y$) go to zero. This leaves only $E_x \cdot E_x^* \approx \frac{1}{2}$, $E_y \cdot E_y^* \approx \frac{1}{2}$, and the angles $\epsilon$ and $\delta$ to describe the output intensities. The intensity along the x-axis is:

$$I_x = \frac{\sin 2\epsilon \cos 2\delta + 1}{2} \qquad (1)$$

which, for small $\delta$ and $\epsilon$, further reduces to:

$$I_x = \frac{1}{2} + \epsilon \qquad (2)$$

Similarly, the intensity along the y-axis is obtained as:

$$I_y = \frac{1}{2} - \epsilon \qquad (3)$$

To neglect the possibility of error due to different responsivities of the detectors which measure $I_x$ and $I_y$ and stray light, the output of the depolarizer in fabrication is collimated by collimator 82. Photodetectors 100, 110 are mounted so that they may be easily switched between each output from the Wollaston and make two extinction ratio measurements of light 10.

The ratio $I_y/\text{Iphd } x \approx 1 - 4\epsilon$ is commonly expressed as $10 \cdot \log(1 - 4\epsilon)$, or the extinction ratio of the light exiting the depolarizer. Convenient, and very accurate, use of this expression can be made by expanding it into a Taylor series and neglecting all but the first order term:

$$10 \cdot \log(1-4\epsilon) = -17 \cdot 4\epsilon \qquad (4)$$

or, recast, the splice misalignment in radians is equal to the extinction ratio in dB divided by −17.4.

In the fabrication and subsequent characterization of a Lyot depolarizer, the extinction ratio C is measured, detectors 100,110 are switched, and extinction ratio D measured so that the true extinction ratio, E, is, $$E = \frac{C - D}{2} \qquad (5)$$

The precision of E is estimated and from that, the precision of the angular misalignment measurement ($\epsilon$) by the propagation of errors. Since C=A−B, where A and B are the respective detector readings from photodetectors 100,110 of the output along each axis, an estimation of $\sigma_c = 0.028$ dB (the $1\sigma$ error in C) can be achieved by conservatively estimating $\sigma_A = \sigma_B = 0.02$ dB and using, $$\sigma_C = \sqrt{\left(\frac{\partial C}{\partial A}\right)^2 \sigma_A^2 + \left(\frac{\partial C}{\partial B}\right)^2 \sigma_B^2} \qquad (6)$$

Defining D=A−B, a similar procedure yields $\sigma_D = 0.028$ dB. Further, by substituting each A, B, and C in (6) with C, D and E respectively, and using (5), then $\sigma_\epsilon = 0.020$ dB. With this result and (4), we find that the 45° angle required for a Lyot depolarizer can be produced with a precision of less than 0.1°.

Because the degree of coherence between light in the two axes is zero when the extinction ratio measurements are made, the degree of polarization, P, is directly measured in this situation as, $$P = \left| \frac{I_x - I_y}{I_x + I_y} \right| = |\sin 2\epsilon| \qquad (7)$$

and by using this simple method, depolarizers which produce light with a degree of polarization on the order of $2 \times 10^{-3}$ or less have been fabricated.

In tracing the path of light 10 through the present invention, with reference to FIG. 4, in a preferred embodiment, light rays 10 from broad band source 52 preferably enter collimating lens 53 then input polarizer 54. Upon exiting input polarizer 54, beam 10 becomes linearly polarized. Linearly polarized beam 10 next enters input coupling lens 56, where light 10 is suitably coupled before entering birefringent fiber 30. Input polarizer 54 suitably only allows linearly polarized beam 10 to enter fiber segment 32, thus suitably allowing light 10 to enter fiber segment 32 entirely on one axis.

With momentary reference to FIG. 2, after traveling through fiber segment 32, light 10 preferably enters fiber 36 at a 45° angle with respect to the axes. With momentary reference to FIG. 1, the electric vector of light 10 is suitably decomposed by the 45° misalignment into its X 12 and Y 14 components which are approximately of equal amplitude (A), and thus, equal intensity.

With momentary reference to FIG. 6, light 10 preferably exits fiber segment 36 and preferably enters output collimator 82, where components 12,14 are suitably collimated. Components 12,14 next preferably enter beam splitter 84, where orthogonal components Ex 12 and Ey 14 are angularly separated. Output photodetectors 100, 110 preferably receive two divergent outputs of beam splitter 84. Photodetector 100 suitably measures intensity of Ex 12 and photodetector 110 suitably measures the intensity of Ey 14 to determine the intensities in decibels relative to a milliwatt of the output along the axes of fiber 30.

In this regard, although a preferred exemplary embodiment of the present invention surrounds a depolarizer and method and apparatus for the depolarization of light, it will be understood that the invention is not so limited. In particular, it will be appreciated that the present invention contemplates virtually any type of method or apparatus for aligning splices and simultaneous detection.

It will be apparent to those skilled in the art, that the foregoing detailed description of a preferred embodiment of the present invention is representative of an apparatus and method for fabricating a depolarizer within the scope and spirit of the present invention. Further, those skilled in the art will recognize that various changes and modifications may be made without departing from the true spirit and scope of the present invention. For example, the locations of the detectors may be changed or any birefringent fiber may be used. Those skilled in the art will recognize that the invention is not limited to the specifics as shown here, but is claimed in any form or modification falling within the scope of the appended claims. For that reason, the scope of the present invention is set forth in the following claims.

We claim:

1. A system for making a depolarizer (120) comprising:
   a source (50) for providing light having first (12) and second (14) electromagnetic components;
   first (32) and second (36) fibers having a length, a first end, a second end and an output;
   means (60) for orienting said first and second birefringent fibers relative to each other, said means for orienting coupled to at least one of said first and second birefringent fibers; and
   a detecting system (80) aligned with an output (38) of said second birefringent fiber (36), the detecting system being configured for substantially analyzing said electromagnetic components (12, 14) and for providing a signal to said means for orienting that is indicative of the relative intensities of said electromagnetic components (12, 14); and
   wherein said detecting system (80) comprises:
   a beam splitter that splits a light beam into the first and second electromagnetic components (12, 14);

a first photo detector (100) for detecting the first electromagnetic component (12); and a second photo detector (110) for detecting the second electromagnetic component (14); and switching means for switching said first and second photo detectors in position so that said first photo detector (100) detects the second electromagnetic component (14) and said second photo detector (110) detects the first electromagnetic component (12).

2. The system of claim 1, wherein said source 50 includes:

a broadband light source (52) having an output;

a collimator (53) having a first side and a second side, said first side of said collimator (53) aligned with said output of said source (52);

a first polarizer (54) having a first side and a second side, said first side of said first polarizer 54 aligned with said output of said collimator (53); and, a first coupling lens (56) having a first side and a second side, said first side of said first coupling lens (56) aligned with said second side of said first polarizer (54), said first end (33) of said first birefringent fiber (32) aligned with said second side of said first coupling lens (56).

3. The system of claim 1, wherein said orienting means (60) includes an adjuster (61, 62) and a fusion splicer (63) having a first end, a second end and at least one birefringent fiber chuck (64), said adjuster (61, 62) and said splicer (63) receiving said first and second birefringent fibers (32, 36).

4. The system of claim 1, wherein said detecting system (80) includes:

a second coupling lens (82) having a first side and a second side, the first side of said second coupling lens 82 aligned with the second end (38) of said second birefringent fiber (36);

a beam splitter (84) having a first side, a first output and a second output, said first side of said beam splitter (84) aligned with said second side of said second coupling lens (82); and, at least one photodetector (100).

5. The system of claim 4, wherein said photodetector comprises a first photodetector having a first side, said first side of said first photodetector aligned with said first output of said beam splitter, and a second photodetector having a first side, said first side of said second photodetector aligned with said second output of said beam splitter.

6. The system of claim 4, wherein said beam splitter comprising a Wollaston analyzer.

7. The system of claim 5, further comprising a device connected to said first and second photodetectors, said device automatically calculating an extinction ratio.

8. The extinction ratio of claim 7, wherein:

said extinction ratio is E; said intensity of said light having a y-component and an x-component; said intensity of said y-component is $I_y$; said intensity of said x-component is $I_x$, and $E=10\log[I_x/I_y]$.

9. The system of claim 1, further comprising an opaque structure shielding said detecting system.

10. The system of claim 1, wherein said first and second birefringent fibers (32, 36) are single mode polarizing maintaining optical birefringent fibers.

11. The system of claim 2, wherein said first birefringent fiber having a predetermined length such that a plurality of new depolarizers can be created from said predetermined length without decoupling said source from said first birefringent fiber.

12. A method of substantially simultaneously measuring electromagnetic components (12, 14) comprising the steps of:

providing a broadband source (50) having an output;

providing a birefringent fiber (30) having a length, a first end and a second end;

providing a means for orienting fibers (60) to each other, coupling said orienting means with said birefringent fiber (30);

providing a detecting device (80), aligning said detecting device (80) with said birefringent fiber (30);

clearing said birefringent fiber 30 into first (32) and second (36) birefringent fiber segments;

aligning said birefringent fiber segments (32, 36) when said source (80) is applied until an extinction ratio of said output (12, 14) of said birefringent fiber is about zero dB; and fusing said birefringent fiber segments (32, 36); and wherein said steps of providing a detecting device (80) comprises:

providing a second coupling lens (82) having a first side and a second side, aligning said first side of said second coupling lens (82) with said second end (38) of said birefringent fiber (36);

providing a beam splitter (84) having a first side, a first output (12) and a second output (14), aligning said first side of said beam splitter (84) with said second side of said second coupling lens (82);

providing a first photodetector (100) having a first side, aligning said first side of said first photodetector (100) with said first output (12) of said beam splitter (84);

providing a second photodetector (110) having a first side, aligning said first side of said second photodetector (110) with said second output (14) of said beam splitter (84); and switching positions of said first (100) and second (110) photodetectors such that said first photodetector (100) is aligned with said second output (14) and said second photodetector (110) is aligned with said first output (12).

13. The method of claim 12, wherein said step of providing a broadband source comprises:

providing a broadband light source having an output;

providing a collimator having a first side and a second side, aligning said first side of said collimator with said output of said source;

providing a first polarizer having a first side and a second side, aligning said first side of said first polarizer with said output of said collimator;

providing a first coupling lens having a first side and a second side, aligning said first side of said first coupling lens with said second side of said first polarizer; and, aligning said first end of said optical birefringent fiber with said second side of said first coupling lens.

14. The method of claim 12, wherein said step of providing an orienting means comprises providing an adjuster and a fusion splicer having an first side, a second side and at least one birefringent fiber chuck, loading said length of said birefringent fiber into said adjuster and said splicer.

15. The method of claim 12, wherein said step of providing a beam splitter comprises providing a Wollaston analyzer.

16. The method of claim 12, further comprising the step of automatically calculating an extinction ratio.

17. The method of claim 16, wherein said calculating step further comprises connecting a device for calculating said extinction ratio to said first and second photodetectors.

18. The method of claim 12, wherein said aligning step comprises providing an accuracy of one order of magnitude.

19. The method of claim 12, wherein said step of providing a birefringent fiber comprises providing a single mode polarizing maintaining optical birefringent fiber.

20. The method of claim 12, further comprising the steps of cleaving completed depolarizer and using remaining length of said birefringent fiber for a plurality of new depolarizers without decoupling said source from said first birefringent fiber.

* * * * *

UNITED STATES PATENT AND TRADEMARK OFFICE
CERTIFICATE OF CORRECTION

PATENT NO. : 5,881,185

DATED : March 9, 1999

INVENTOR(S) : John R. Feth, Joseph F. Straceski, Isaac R. Jessop

It is certified that error appears in the above-identified patent and that said Letters Patent is hereby corrected as shown below:

Column 7, line 22, column 7 cancel "$I_y/I_{phd} x \approx 1-4\epsilon$" and substitute --$I_y/I_x \approx 1-4\epsilon$--.

Signed and Sealed this

Twenty-first Day of September, 1999

Attest:

Q. TODD DICKINSON

*Attesting Officer*     *Acting Commissioner of Patents and Trademarks*